US010063793B2

(12) United States Patent
Honda

(10) Patent No.: US 10,063,793 B2
(45) Date of Patent: Aug. 28, 2018

(54) IMAGING DEVICE AND METHOD FOR TAKING AN IMAGE AND GENERATING COMPOSITE IMAGE DATA WITH APPROPRIATE EXPOSURE

(71) Applicant: Olympus Corporation, Hachioji-shi, Tokyo (JP)

(72) Inventor: Tsutomu Honda, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/141,294

(22) Filed: Apr. 28, 2016

(65) Prior Publication Data
US 2016/0337600 A1    Nov. 17, 2016

(30) Foreign Application Priority Data
May 13, 2015 (JP) ................................. 2015-097998

(51) Int. Cl.
*H04N 5/265* (2006.01)
*H04N 5/262* (2006.01)
*H04N 5/243* (2006.01)
*H04N 5/77* (2006.01)
*H04N 5/232* (2006.01)
*H04N 5/235* (2006.01)
*H04N 5/238* (2006.01)

(52) U.S. Cl.
CPC ............. *H04N 5/265* (2013.01); *H04N 5/238* (2013.01); *H04N 5/2353* (2013.01); *H04N 5/23229* (2013.01); *H04N 5/23232* (2013.01); *H04N 5/243* (2013.01); *H04N 5/2621* (2013.01); *H04N 5/772* (2013.01)

(58) Field of Classification Search
CPC ...... H04N 5/265; H04N 5/772; H04N 5/2352; H04N 5/378; H04N 5/341
USPC ........................................................ 348/229.1
See application file for complete search history.

(56) References Cited

U.S. PATENT DOCUMENTS

| 2012/0044381 | A1* | 2/2012 | Jannard | ................. | H04N 5/235 |
|---|---|---|---|---|---|
| | | | | | 348/229.1 |
| 2012/0182455 | A1* | 7/2012 | Gomi | ................. | H04N 5/23245 |
| | | | | | 348/311 |
| 2015/0156386 | A1* | 6/2015 | Miyakoshi | ........... | H04N 5/2355 |
| | | | | | 348/230.1 |

(Continued)

FOREIGN PATENT DOCUMENTS

JP    2007-189295    7/2007

*Primary Examiner* — Lin Ye
*Assistant Examiner* — Chan T Nguyen
(74) *Attorney, Agent, or Firm* — John C. Pokotylo; Pokotylo Patent Services

(57) ABSTRACT

An imaging device that shoots and records a moving image, the device comprising: an imaging section configured to repeatedly perform imaging at a cycle shorter than the frame rate of the moving image and output image data; an image processing section including a plurality of image composition processing, which is preliminarily determined, and configured to generate a composite image by performing image composition on a series of the image data, which are output from the imaging section, in one processing of the plurality of image composition processing; and an exposure calculation section configured to instruct, based on a field brightness, one processing of the plurality of image composition processing of the series of image data.

6 Claims, 8 Drawing Sheets

(56) References Cited

U.S. PATENT DOCUMENTS

2015/0156387 A1* 6/2015 Miyakoshi ......... H04N 5/35536
           348/367
2016/0105656 A1* 4/2016 Lin ....................... H04N 9/735
           348/223.1

* cited by examiner

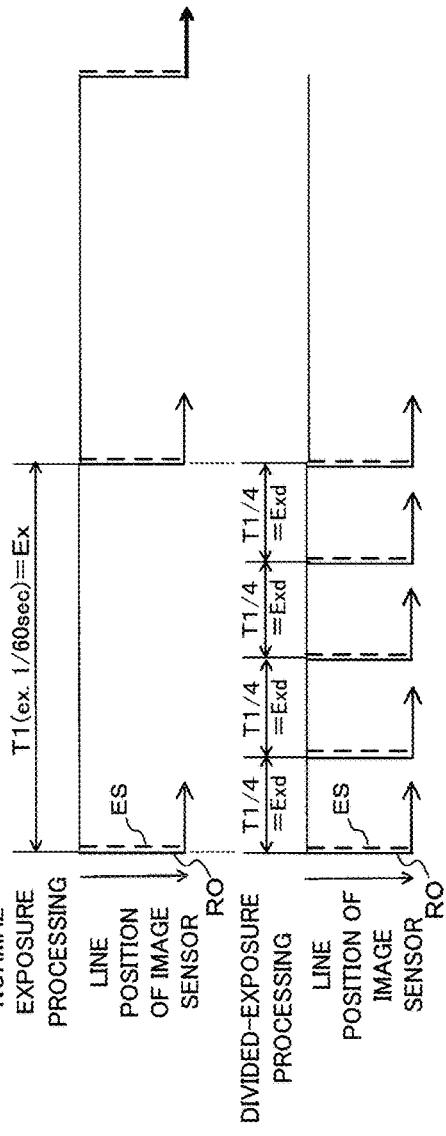
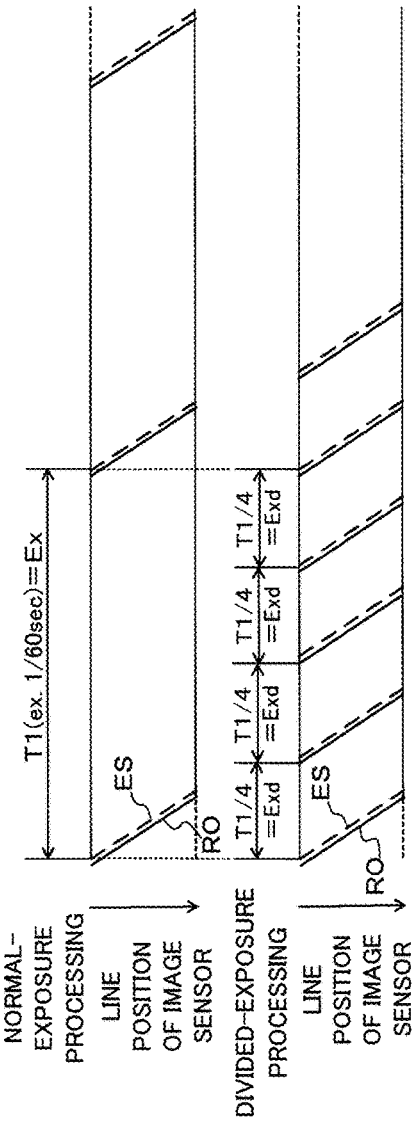

FIG. 4

| IMG CTRL | OFF/ON |
|----------|--------|
| LV COMP  |        |
| LV BLB   |        |
| DND      |        |
| HDR      |        |
| H:SP     |        |

FIG. 5

| DND | SEL | DIMMING AMOUNT | TV | SV |
|---|---|---|---|---|
| | AUTO | 0~4 (AUTOMATIC ADJUSTMENT) | VARIABLE | VARIABLE (GAIN, PIXEL MIXING) |
| | MANU | 1/3, 2/3, 1, 1 1/3, 1 2/3, 2, 2 1/3, 2 2/3, 3, 3 1/3, 3 2/3, 4 | FIXED | FIXED |

FIG. 6

BRIGHT ←——————————————→ DARK

| No | BV | S/S | OUTPUT OF IMAGE SENSOR | ADDITION | GAIN | |
|---|---|---|---|---|---|---|
| A | ↑ | 1/360 | $V_0$ | AVERAGE-ADDITION | 1 | |
| B | $BV_0$ ↔ | 1/240 | $V_0$ | AVERAGE-ADDITION | 1 | $V=(V1+V2+V3+V4)/4$ |
| C | ↕ | ↑ | $V_0 \sim V_0/2$ | AVERAGE-ADDITION | $1+\alpha$ | |
| D | $BV_0-1$ | ↑ | $V_0/2$ | CUMULATIVE PARTIAL ADDITION → AVERAGE-ADDITION | 1 | $Va=V1+V2$ $Vb=V3+V4$ $V=(Va+Vb)/2$ |
| E | ↕ | ↑ | $V_0/2 \sim V_0/4$ | CUMULATIVE PARTIAL ADDITION → AVERAGE-ADDITION | $1+\alpha$ | |
| F | $BV_0-2$ | ↑ | $V_0/4$ | CUMULATIVE ADDITION | 1 | $V=V1+V2+V3+V4$ |
| G | ↕ | ↑ | $V_0/4 \sim V_0/8$ | CUMULATIVE ADDITION | $1+\alpha$ | |
| H | $BV_0-3\sim$ | ↑ | $V_0/8\sim$ | CUMULATIVE ADDITION | $1\sim 4$ | *READ TWO MIXED PIXELS |

IMAGING DEVICE AND METHOD FOR TAKING AN IMAGE AND GENERATING COMPOSITE IMAGE DATA WITH APPROPRIATE EXPOSURE

Benefit is claimed, under 35 U.S.C. § 119, to the filing date of prior Japanese Patent Application No. 2015-097998 filed on May 13, 2015. This application is expressly incorporated herein by reference. The scope of the present invention is not limited to any requirements of the specific embodiments described in the application.

BACKGROUND OF THE INVENTION

1. Field of the Invention

The present invention relates to imaging devices and imaging methods for shooting a moving image and recording image data of the moving image.

2. Description of Related Art

Conventionally, an imaging device has an AE (Auto Exposure) processing function, calculates an appropriate exposure amount based on a brightness component of image data, and controls a shutter speed, an aperture, an ISO sensitivity, and the like. At the time of moving image shooting, the exposure time (shutter speed) of each frame is controlled by a so-called electronic shutter. Therefore, in controlling so as to achieve appropriate exposure at a shutter speed, if the brightness of a subject is high, the electronic shutter speed becomes shorter than the frame rate of a moving image. In this case, the reproduced moving image produces a flipping feeling (the feeling that the image instantaneously changes and awkwardly moves, as in a flip comic), resulting in an unnatural moving image instead of showing a smooth movement.

Then, an imaging device has been proposed for reducing the shutter speed and edge enhancement in the case of a moving subject while increasing the shutter speed and edge enhancement in the case of a static subject (see Japanese Patent Laid-Open No. 2007-189295 (Patent Literature 1)).

At the time of moving image shooting, the moving image needs to be recorded in accordance with the frame rate in reproducing the moving image. For example, in the case of a full high definition television (2K moving image), there are the standards of 60p and 30p, in which 60 frames and 30 frames are shot per second, respectively. There is a method for changing the aperture, gain, and ND filter in accordance with the shutter speed in order to make the lightness of an image constant.

In the case of a moving subject, unless the shutter speed is basically adjusted to the recording frame rate (e.g., the shutter speed is adjusted to $\frac{1}{30}$ seconds in the case of HD 30P), all of the movements of the subject within a time period corresponding to one frame cannot be recorded. That is, the shutter speed is determined in accordance with the recording standard, and therefore as described in Patent Literature 1, the flipping feeling cannot be eliminated at all even if the shutter speed is imperfectly changed in accordance with the brightness of the subject.

Moreover, there can be contemplated a method for adjusting the shutter speed in accordance with the recording frame rate, and putting in/out, at high speed, an ND filter (dimming filter) to/from the optical path of a shooting optical system in response to a change in the brightness of a subject, and a method for quickly varying the aperture. However, such methods make human eyes feel blinking and therefore will degrade the quality of an image in more sophisticated moving image shooting.

Moreover, a method for changing the gain can be contemplated. In this case, if a subject becomes lighter, the gain tends to be reduced, and therefore even if the gain is reduced to 0 dB or less and when the image signal from an image sensor saturates, the linearity of lightness cannot be secured. This problem can be solved by slowly moving the aperture. However, taking into consideration that for still image shooting an aperture which can be moved at high speed is needed, individual apertures have to be provided for still image shooting and for moving image shooting, resulting in an increase in size of the device. Moreover, a small device without an aperture mechanism has to be controlled using an ND filter and thus the quality of an image will degrade as described above.

SUMMARY OF THE INVENTION

An object of the present invention is to provide an imaging device and imaging method capable of generating image data having an appropriate exposure amount without producing a flipping feeling at the time of moving image shooting.

According to the present invention, there is provided an imaging device that shoots and records a moving image, the device comprising: an imaging section configured to repeatedly perform imaging at a cycle shorter than a frame rate of the moving image and output image data, wherein the imaging section includes an image sensor and an optical lens for forming a subject image on the image sensor; an image processing section including a plurality of image composition processing, which is preliminarily determined, and configured to generate a composite image by performing image composition on a series of the image data, which are output from the imaging section, in one processing of the plurality of image composition processing; and an exposure calculation section configured to instruct, based on a field brightness, one processing of the plurality of image composition processing of the series of image data.

According to the present invention, there is provided an imaging method for shooting and recording a moving image, the imaging method comprising the steps of: repeatedly performing imaging at a cycle shorter than a frame rate of the moving image and outputting image data; generating a composite image by performing image composition on a series of the image data in one processing of a plurality of image processing; and instructing, based on a field brightness, one processing of the plurality of image composition processing of the series of image data.

BRIEF DESCRIPTION OF THE DRAWINGS

FIG. 2A and FIG. 2B each show the exposure timing at the time of normal-exposure processing and at the time of divided-exposure processing in the camera according to the embodiment of the present invention.

FIG. 4 shows a setting screen for setting the imaging control in the camera according to the embodiment of the present invention.

FIG. 5 is a table showing sub-modes of a digital ND (hereinafter, referred to as "DND") filter shooting mode in the camera according to the embodiment of the present invention.

FIG. 6 is a table showing image composition processing that is determined by the brightness of a subject at the time of divided-exposure processing, in the camera according to the embodiment of the present invention.

DETAILED DESCRIPTION OF THE PREFERRED EMBODIMENTS

Hereinafter, an example applied to a digital camera (hereinafter, referred to as camera) as an embodiment of the present invention will be described. This camera includes an imaging section, converts a subject image to image data by this imaging section, and displays a live view of the subject image, based on this converted image data, on a display section arranged on the rear surface or the like of the main body of the camera (the display section may be an electronic view finder for observing a subject image via an eyepiece section). A photographer determines a composition and/or shutter timing by observing the displayed live-view. At the time of still image shooting, once a release button is operated, the image data of the still image is recorded on a recording medium. At the time of moving image shooting, once a video button or the like is operated, moving image shooting is started, and once the video button or the like is operated again, the moving image shooting is finished. The image data of the still image or moving image recorded on the recording medium can be reproduced and displayed on the display section once a reproduction mode is selected.

In moving image shooting, the exposure time corresponding to the frame rate is divided into a plurality of exposure time periods, and image data is read for each of the divided-exposure time periods, and then image composition is performed so as to obtain the image data having an appropriate exposure amount by use of the read plurality of pieces of image data. In performing this image composition, a plurality of image composition processing is prepared in advance, and optimum image composition processing is selected in accordance with the field brightness from among the plurality of image composition processing and performed (e.g., see No. 1 to No. 5 of FIG. 3, FIG. 6, S39 to S61 of FIG. 8, S71 to S79 of FIG. 9, and the like).

Figure 1:
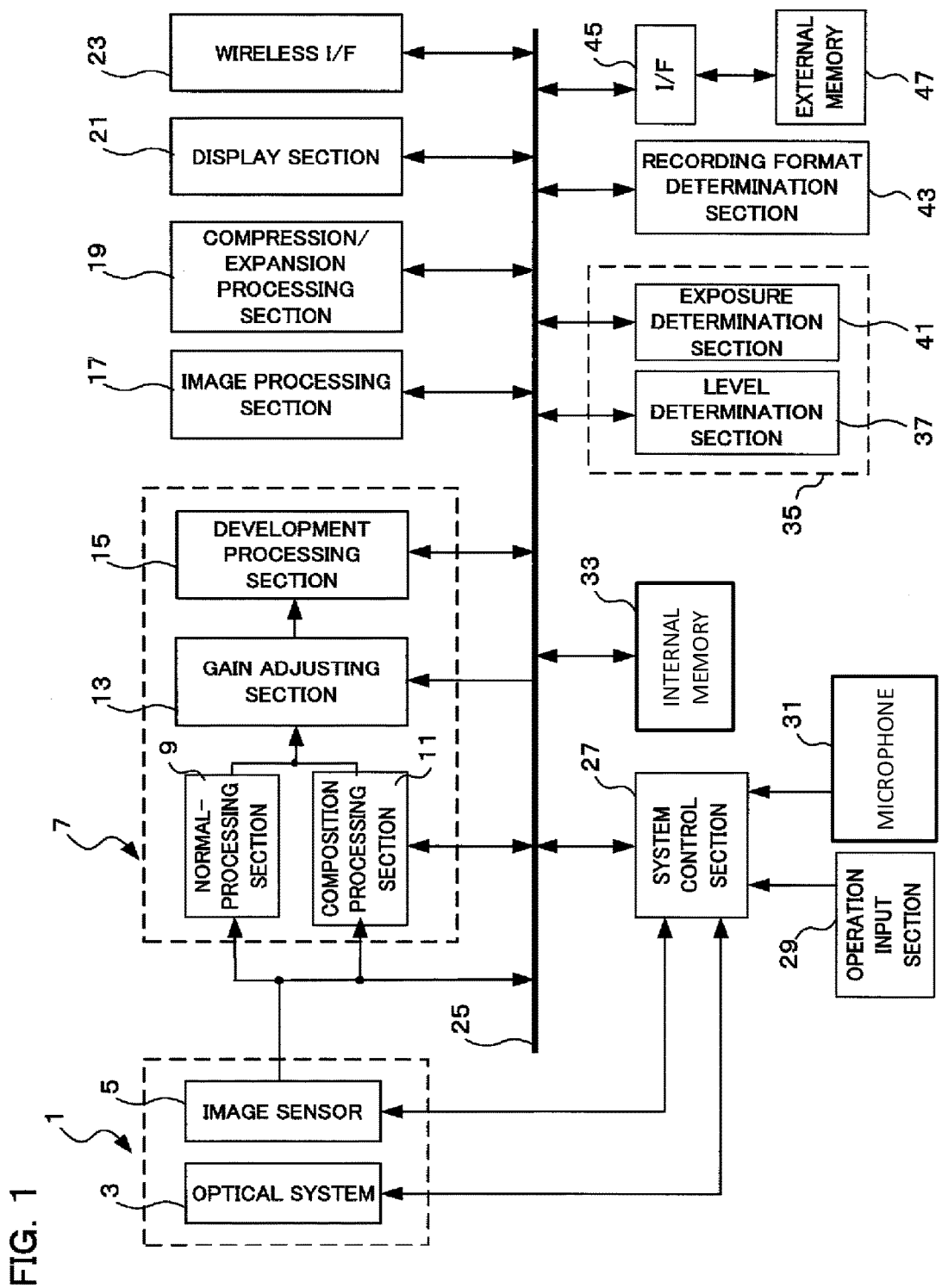
FIG. 1 is a block diagram mainly showing an electric configuration of a camera according to an embodiment of the present invention.

FIG. 1 is a block diagram mainly showing an electric configuration of a camera according to an embodiment of the present invention. An imaging section 1 includes an optical system 3 and an image sensor 5. The optical system 3 forms an optical image of a subject on the image sensor 5. The optical system 3 has a focus lens, and the focus lens can move in an optical axis direction by means of a lens driving mechanism in response to a driving control signal from a system control section (system controller) 27.

The optical system 3 may include an aperture that determines an aperture value for adjusting the exposure amount. Moreover, a mechanical shutter may be provided between the optical system 3 and the image sensor 5, and the mechanical shutter may expose or shield light to the image sensor 5 by an opening or closing operation to control the mechanical shutter speed.

The image sensor 5 is a CMOS image sensor, a CCD image sensor, or the like, and converts, for each pixel, an optical image of a subject formed by the optical system 3 into an electric signal, and outputs image data. In outputting this image data, the image sensor 5 performs exposure and readout of the image data according to the imaging control signal from the system control section 27. The image sensor 5 has an electronic shutter function performed at the time of moving image shooting, and can control the exposure time. The image sensor 5 repeatedly performs imaging at a cycle shorter than the frame rate of a moving image, and functions as an imaging section that outputs image data.

Figure 9:
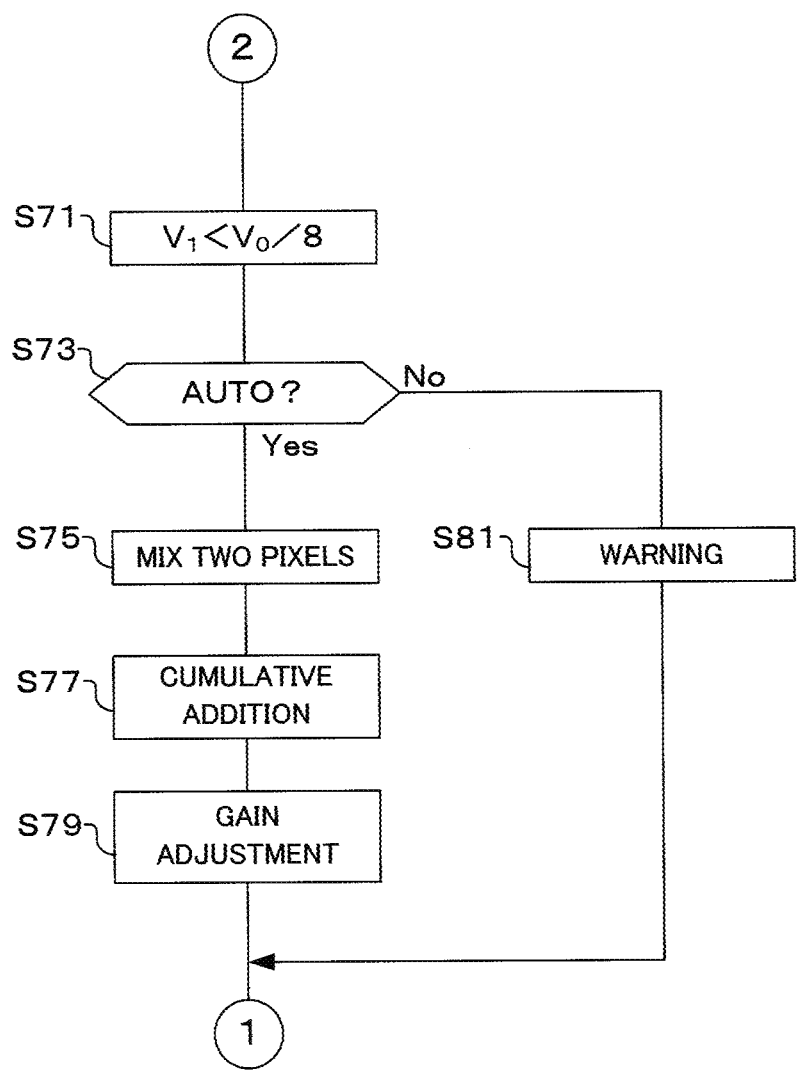
FIG. 9 is a flow chart (part 2) showing the operation of DND control in the camera according to the embodiment of the present invention.

According to an instruction from the system control section 27 or exposure determination section 41, the image sensor 5 can also add the outputs of two pixels to output image data (this is referred to as "two-pixel mixing") (see S77 of FIG. 9). The image data read out by the image sensor 5 is output to a normal-processing section and composition processing section 11 in a pre-processing section 7 and to a bus 25. The bus 25 is a signal line for transmitting and receiving a signal between the respective blocks.

The normal-processing section 9, the composition processing section 11, a gain adjusting section 13, and a development processing section 15 are provided in the pre-processing section 7.

In shooting a moving image and/or in using digital ND, the composition processing section 11 performs divided-exposure and performs the composition processing of the image data obtained in each divided-exposure. This composition processing is performed according to a control signal from the system control section 27, the divided-exposure control section 35, or the like. The composition processing section 11 performs the composition processing, such as the later described average-addition (e.g., see No. 4 of FIG. 3, No. B to No. C of FIG. 6, and S45 of FIG. 8), partial addition (e.g., see No. 3 of FIG. 3, No. D to No. E of FIG. 6, and S51 of FIG. 8), and cumulative addition (e.g., see No. 2 of FIG. 3, No. F to No. H of FIG. 6, and S55 of FIG. 8).

On the other hand, the normal-processing section 9 processes the image data which is obtained in one exposure when the composition processing is not performed, such as at the time of still image shooting.

The gain adjusting section 13 applies a gain to the image data output from the normal-processing section 9 and composition processing section 11, i.e., multiplies the image data by k, and outputs the result to the development processing section 15. The composition processing section 11 and gain adjusting section 13 each include a plurality of image composition processing, which is preliminarily determined, and functions as an image processing section that combines a series of image data output from the imaging section in one processing of the plurality of image processing to generate a composite image (e.g., FIG. 3, S45 to S47, S51 to S55, and S59 to S61 of FIG. 8, and S75 to S79 of FIG. 9). This image processing section performs at least one of the cumulative addition, "cumulative addition+gain-up", and average-addition.

The development processing section 15 performs development processing, such as de-mosaicking, white-balance adjustment, and gamma correction, on the raw image data generated by the normal-processing section 9 or composition processing section 11. The image data subjected to the development processing is output to the bus 25.

An image processing section 17 performs various types of image processing: such as the image processing for live-view display, still image recording, and moving image recording on the image data processed by the development processing section 15 or the like; and the basic image processing, such as WB (white balance), NR (noise reduction), dark current correction, distortion aberration correction, chromatic aberration correction, and the like, for reproduction display on the image data recorded on an external memory 47.

A compression/expansion processing section 19 performs image compression processing, such as JPEG or MPEG, in recording image data onto the external memory 47. Moreover, the compression/expansion processing section 19 expands the compressed image data in reading image data from the external memory 47 and displaying it on a display section (display) 21.

The display section 21 has a monitor, such as a TFT (Thin Film Transistor) liquid crystal or organic EL, and displays an image based on the image data in a rear surface display section or an EVF (electronic viewfinder). A wireless interface (I/F) 23 is an interface for wirelessly communicating with an external device.

A system control section (system controller) 27 has a control circuit, such as a CPU (Central Processing Unit), and a peripheral circuit thereof, and controls the whole camera in accordance with a program stored in a non-volatile memory in an internal memory 33.

An operation input section (operation input device) 29 has, for example, the operating members, such as a release button, a video button, and a cross-shaped button, and a touch panel for inputting a touch operation in the rear surface display section or the like, and sets various types of modes and/or instructs a shooting operation based on a user operation. The photographer can set, via the operation input section 29, the shooting mode, for example, such as a live composite shooting mode, such as relatively bright composition or relatively dark composition, a live bulb shooting mode, a digital ND filter shooting mode, a high dynamic range shooting mode, and a high speed shooting mode (for these shooting modes, see FIG. 4).

A microphone 31 converts sound into audio data, and outputs it to the system control section 27. At the time of moving image shooting, the audio data converted by the microphone 31 is recorded together with the moving-image data. Note that, a speaker for reproducing a moving image may be provided.

The internal memory 33 temporarily stores various setting information required for camera operations, and the image data currently being processed at the time of image processing. The internal memory 33 has a memory, such as a rewritable non-volatile flash memory, or a rewritable volatile SDRAM.

The external memory 47 is a non-volatile storage medium that is loadable into a camera body or fixed to the inside of a camera, and is an SD card, a CF card or the like, for example. This external memory 47 records image data via an interface (I/F) 45, while at the time of reproduction the image data that is recorded via the I/F 45 is read out.

A recording format determination section 43 determines the recording format in recording a moving image. In the embodiment, a plurality of recording formats is stored in a non-volatile memory inside the internal memory 33 in advance, and the plurality of recording formats (e.g., 24P, 30P, 60P) is displayed on a menu screen, so that a user specifies a recording format by operation of a cross-shaped button, a touch operation on a touch panel, and so on.

A level determination section 37 and an exposure determination section 41 are provided in the divided-exposure control section 35. The level determination section 37 determines a level of the field brightness based on the image data from the image sensor 5. In the embodiment, a field brightness $V_1$ is compared with determination values $kV_0$, $V_0/2$, $V_0/4$, and $V_0/8$ to determine six levels (see the S39, S43, S49, S57 of FIG. 8, and S71 of FIG. 9).

The exposure determination section 41 determines the aperture value and ISO sensitivity for achieving an appropriate exposure, based on the exposure time (shutter speed) determined by the recording format that is determined by the recording format determination section 43. Moreover, the exposure determination section functions as an exposure calculation section that instructs to perform one processing of a plurality of image composition processing on the image data which is level-classified by the level determination section based on the field brightness. For example, in the example shown in FIG. 3, image data is classified into No. 1 to No. 5 in accordance with the field brightness. In accordance with this classification, the addition processing, such as average-addition, partial addition, and cumulative addition, or the processing, such as gain-up, are performed.

Figure 8:
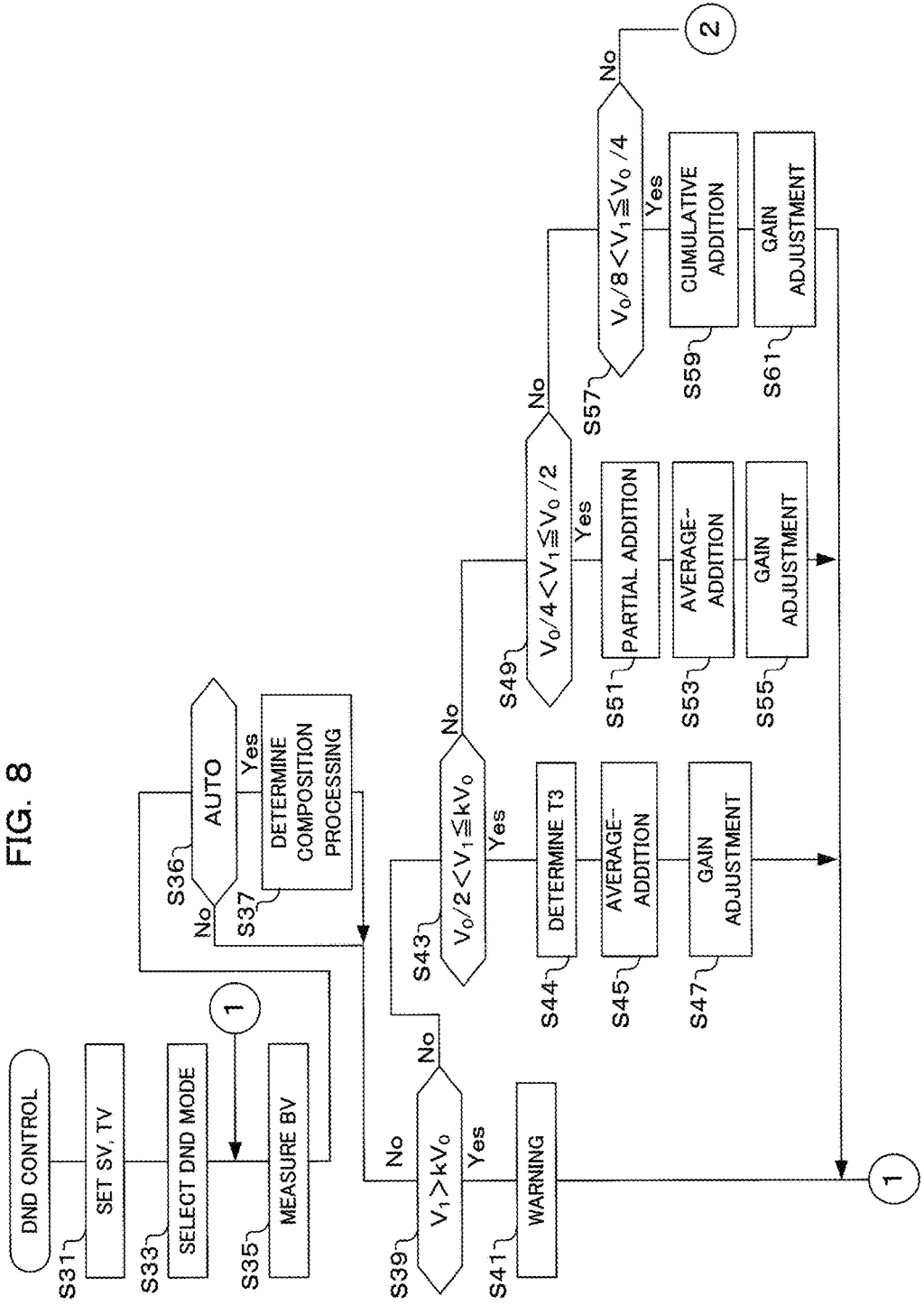
FIG. 8 is a flow chart (part 1) showing the operation of DND control in the camera according to the embodiment of the present invention.

Moreover, in the examples shown in FIG. 8 and FIG. 9, the image data is divided into six classifications in accordance with the field brightness (S37, S41, S47, S53, and S61). Based on this classification, the addition processing, such as average-addition, partial addition, and cumulative addition, and the processing, such as gain adjustment and two-pixel mixing, are performed (S45 to S47, S51 to S55, S59 to S61, and S75 to S79). The exposure determination section 41 functions as an exposure calculation section that outputs an instruction to change one processing of the plurality of image composition processing in accordance with a change in the field brightness.

Next, the normal-exposure processing and divided-exposure processing will be described using FIG. 2. In each of FIG. 2A and FIG. 2B, the upper part indicates the normal-exposure processing and the lower part indicates the divided-exposure processing, while the horizontal axis represents a temporal change. Moreover, FIG. 2A shows an example of the exposure processing of an image sensor provided with an electronic global shutter in a CCD image sensor or the like, while FIG. 2B shows an example of the exposure processing of an image sensor provided with an electronic rolling shutter in a C-MOS image sensor or the like.

In the examples shown in FIG. 2A and FIG. 2B, in the normal-exposure processing one exposure is performed within one frame by an electronic shutter function whether the image sensor 5 is an electronic global shutter or an electronic rolling shutter. A cycle T1 of one frame of this normal-exposure processing is 60 fps (60 frame second=1/60 sec) in the examples shown in FIG. 2A and FIG. 2B. In the embodiment, the normal-exposure is performed during live-view display.

Moreover, in the case of the divided-exposure processing, the cycle of one frame is 60 fps which is the same as the case of the normal-exposure processing, and in this example, four-divided exposure processing is performed within the time T1 of one frame. That is, within the time T1, exposure is performed four times with a divided-exposure time Exd, and the image data is read out every time the exposure is performed. For each exposure, the exposure is started at a timing ES and the image data is read out at a timing RO. Even when the divided-exposure processing is performed, as shown in each lower part of FIG. 2A and FIG. 2B, most of the time in the cycle T of one frame is the exposure time.

In the case of the electronic global shutter of the CCD image sensor or the like shown in FIG. 2A, readout of data and exposure start of the next frame can be simultaneously performed. Moreover, in the case of the C-MOS image sensor provided with an electronic rolling shutter, as shown in FIG. 2B, the data is read into the image sensor once and then the data is slowly output to the outside of the image sensor. As described above, although the timing of exposure start and timing of readout differ between the electronic global shutter and the electronic rolling shutter, the divided-exposure processing can be performed in either of the methods.

Next, a method for composing an image equal to an image of an appropriate exposure amount after performing the divided-exposure processing will be described using FIG. 3.

Figure 3:
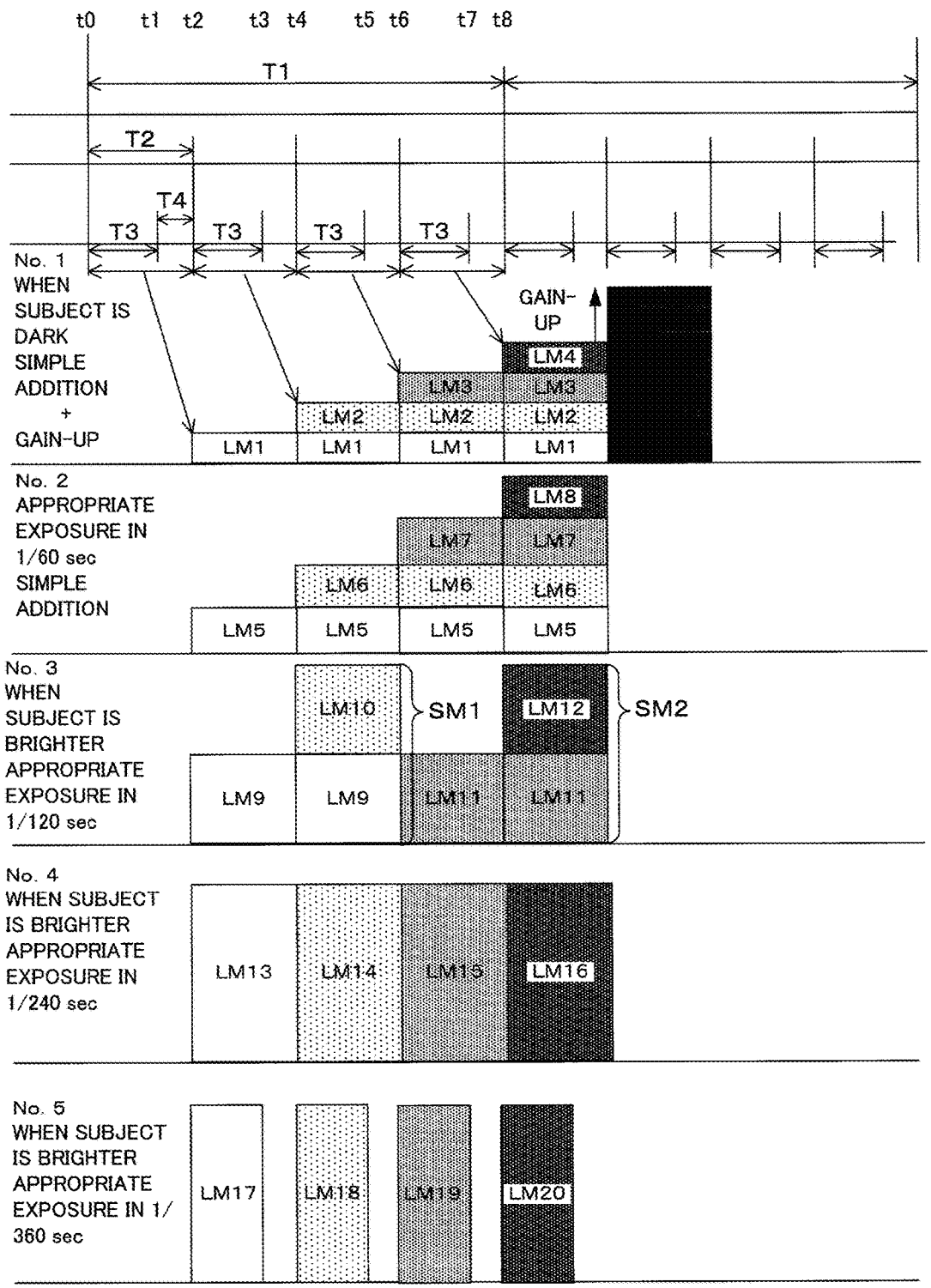
FIG. 3 shows an exposure amount in a divided-exposure time period at the time of divided-exposure processing and composition processing in the camera according to the embodiment of the present invention.

In FIG. 3, time t0 to time t8 correspond to one frame period T1 (T1=1/60 seconds, in the example shown in FIG. 3). In this example, a C-MOS image sensor is used as the image sensor 5. Here, image data is read out with a rolling shutter. The number of times of divided-exposure in one frame is set to four, and thus one frame of image data is read out in each T2. Moreover, the exposure time in a divided frame is T2 (1/240 sec) (corresponding the time period during the times t0 to t2, t2 to t4, t4 to t6, . . . ), and a time period T3 is the exposure time (1/360 sec) when the subject field is brighter, as shown in No. 5 described later.

In the embodiment, a plurality of image composition processing is prepared in advance, and one image composition processing is selected from among the plurality of image composition processing in accordance with lightness of a field brightness. In the example shown in FIG. 3, five types of image composition processing No. 1 to No. 5 are prepared in accordance with the lightness in advance.

The example shown by No. 1 of FIG. 3 is a case where a subject field is dark enough for the exposure time not to achieve an appropriate exposure amount in 1/60 seconds. In this case, the image data obtained in each exposure time T2 is cumulatively added, and the gain is increased so that this cumulatively added image data has an appropriate exposure level. That is, the composition processing section 11 cumulatively adds an exposure amount LM1 exposed during time t0 to time t2, an exposure amount LM2 exposed during the time t2 to time t4, an exposure amount LM3 exposed during the time t4 to time t6, and an exposure amount LM4 exposed during the time t6 to time t8. However, only with this cumulative addition, an appropriate amount of light cannot be obtained, and therefore the gain adjusting section 13 applies a gain so as to have an appropriate amount of light. Note that, in S59 to S61 of FIG. 8 described later, a procedure similar to that in No. 1 is performed.

The example shown by No. 2 of FIG. 3 is a case where the subject field is light enough for the exposure time to achieve an appropriate exposure amount in 1/60 seconds. In this case, if the image data obtained in each exposure time T2 is cumulatively added, an appropriate exposure amount is obtained. Specifically, the composition processing section 11 cumulatively adds an exposure amount LM5 exposed during the time t0 to time t2, an exposure amount LM6 exposed during the time t2 to time t4, an exposure amount LM7 exposed during the time t4 to time t6, and an exposure amount LM8 exposed during the time t6 to time t8. Only with this cumulative addition, an appropriate amount of light is obtained, Note that, if in S59 to S61 of FIG. 8 described later the gain adjustment amount in S61 is set to one, a procedure similar to that in No. 2 is performed.

The example shown by No. 3 of FIG. 3 is a case where the subject field is lighter than No. 2, and an appropriate exposure amount is obtained in the exposure time of 1/120 seconds. In this case, if the image data obtained in each exposure time T2 is partially added and the added values are averaged, an appropriate exposure amount is obtained. That is, the composition processing section 11 calculates an added value SM1 by adding an exposure amount LM9 exposed during the time t0 to time t2 and an exposure amount LM10 exposed during the time t2 to time t4, and calculates an added value SM2 by adding an exposure amount LM11 exposed during the time t4 to time t6 and an exposure amount LM12 exposed during the time t6 to time t8. Then, an average value of this added value SM1+SM2, i.e., (SM1+SM2)/2, is the appropriate amount of light. Note that, in S51 to S53 of FIG. 8 described later, a procedure similar to that in this No. 3 is performed.

The example shown by No. 4 of FIG. 3 is a case where the subject field is lighter than No. 3, and an appropriate exposure amount is obtained in the exposure time of 1/240 seconds. In this case, if the image data obtained in each exposure time T2 is cumulatively added and the cumulatively added values are averaged, an appropriate exposure amount is obtained. The composition processing section 11 may cumulatively add an exposure amount LM13 exposed during the time t0 to time t2, an exposure amount LM14 exposed during the time t2 to time t4, an exposure amount LM15 exposed during the time t4 to time t6, and an exposure amount LM16 exposed during the time t6 to time t8, and average the cumulatively added values, i.e., divides the cumulatively added value by four (this calculation is referred to as "average-addition"). Only with this average-addition, an appropriate amount of light is obtained. Note that, if in S44 to S47 of FIG. 8 described later, T3=T2 in step S44 and the gain adjustment amount in step S47 is set to one, the procedure becomes similar to that of No. 4.

The example shown by No. 5 of FIG. 3 is a case where the subject field is lighter than No. 4, and an appropriate exposure amount is obtained in the exposure time of 1/360 seconds. In this case, the exposure time T3 is reduced (T3×240/360=T3×2/3, in this example) so as to reduce the value of each image data obtained by divided-exposure. That is, an appropriate exposure amount is calculated by average-adding the respective exposure amounts LM17, LM18, LM19, and LM20 (see S44 to S47 of FIG. 8).

Next, setting of the shooting modes related to imaging control will be described using FIG. 4. In the embodiment, an "imaging control mode" is provided for obtaining various images by controlling the imaging operation in the image sensor 5 and performing the composition processing (however, image composition is not performed in high speed shooting) and the like on image data. The imaging control mode is displayed as shown in FIG. 4 as a menu screen of the display section 21, and a user can make selection.

Figure 4:
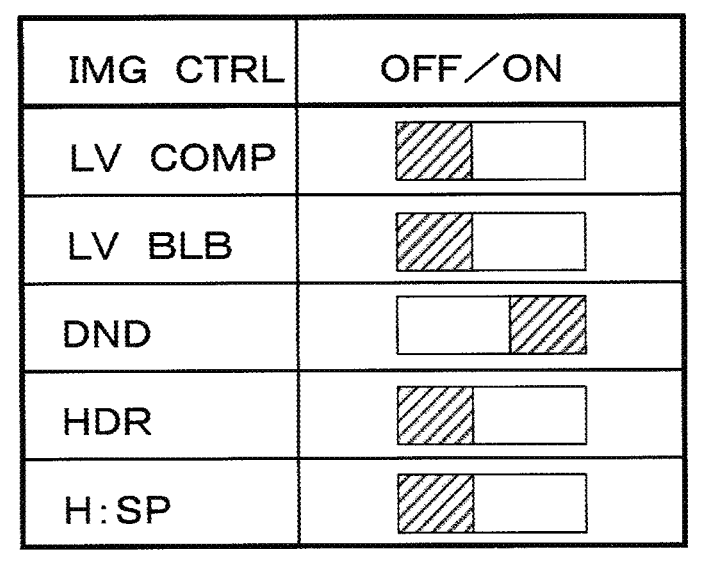

In FIG. 4, "IMG CTRL" on the left of the top row indicates each selection item of image control, "ON" on the right of the top row indicates a set state, and "OFF" indicates an unset state. As the imaging control mode, in the example shown in FIG. 4, live composite shooting (designated by "LV COMP") is in an unset state, live bulb shooting (designated by "LV BLB") is in an unset state, digital ND filter shooting (designated by "DND") is in a set state, high dynamic range shooting (designated by "HDR") is in an unset state, and high speed shooting (designated by "HiSP") is in an unset state. Note that, although only one type of imaging control mode is set in this example, a plurality of types of modes can be also set.

The live composite shooting (LV COMP) is used in shooting a subject having a relatively low brightness. Here, exposure is repeatedly performed and image composition is performed using the image data output for each exposure. For image composition, overwrite is performed using the data of a relatively bright or dark pixel at each pixel position between a current frame image and a previous frame image. For example, if relatively bright composition is performed in shooting a highway at night, an image is obtained in which only the locus of the bright light of a car is composed as the car moves. Moreover, if relatively dark composition is performed, an image having only the background image is obtained in which the light of a car is eliminated.

The live bulb shooting (LV BLB) is also used in shooting a subject having a relatively low brightness. Here, exposure is repeatedly performed and the pixel value at each pixel position is added and combined as the time elapses. For example, if the light trails of the fireworks launched and then exploded are shot as in the case of the bulb shooting, the elapsed images are displayed during the shooting.

In the digital ND filter shooting (DND), shooting in a dimmed state, which is similar to shooting with an optical filter, is performed under digital control without using an optical filter. In shooting a moving image, if this DND mode is set, even a bright scene can be shot with the aperture being opened. The examples shown in FIG. 3, FIG. 8 and FIG. 9 correspond to the control when this DND mode is set.

In the high dynamic range shooting (HDR), a plurality of frames of images each having a different exposure amount is combined to generate an image whose gradation has been expanded. A plurality of frames of images is obtained with the varied exposure time, and a plurality of frames of images is obtained with the varied sensitivity, and an image having the reproduced gradation of a region in a saturation state or in a dark state is composed using the plurality of frames of images.

In the high speed shooting (HiSP), exposure is performed using the so-called electronic shutter in an extremely short time in order to make a moving body still, thereby obtaining an image. In the case of a mechanical shutter, it is difficult to perform extremely short time exposure, while in the case of an electronic shutter, extremely short time exposure can be performed because the electronic shutter controls only the accumulating timing of charges in the image sensor 5.

Next, a submenu when the digital ND filter shooting mode has been selected will be described using FIG. 5. For the digital ND filter shooting mode, a manual digital ND filter shooting mode and an automatic digital ND filter shooting mode are prepared in advance. Moreover, in the manual digital ND filter shooting mode, a dimming rate can be selected. In FIG. 5, in a column of "SEL", automatic (AUTO) and manual (MANU) can be selected, and a brightness range is set in which the dimming amount can be adjusted by "dimming".

Once "AUTO" is selected, then the mode becomes the automatic digital ND filter shooting mode, and the dimming rate of a digital ND filter automatically switches in response to the brightness, thereby performing automatic dimming control with the aperture fixed to −4 EV. In all the above-described shooting of FIG. 3, the dimming rate automatically changes.

If "MANU" is selected, the mode becomes the manual digital ND filter shooting mode and a user fixes the dimming amount of a selected ND filter. As the fixed dimming amount, the dimming amount can be changed in the unit of ⅓ in the example shown in FIG. 5. However, not limited thereto, the dimming amount may be varied in the unit of ½ or in the unit of ¼, or otherwise may be more finely changed. In the manual digital ND filter shooting mode, although the brightness change range is small in which an appropriate exposure is obtained, an effect similar to that of the optical ND filter can be obtained. The digital ND filter shooting has the following merits: the digital ND filter does not need to be attached and detached, unlike the optical ND filter; and as compared with the optical ND filter, the ND dimming amount can be finely set (the optical ND filter is usually set in the unit of stage), the digital ND filter is neither soiled nor damaged, and the digital ND filter can be switched in a short time.

Next, the exposure control and composition processing in accordance with the field brightness when the digital ND filter shooting mode has been set will be described using FIG. 6. In the embodiment, as described above, one image composition processing is selected in accordance with the field brightness, from among a plurality of image composition processing so as to process image data. FIG. 6 shows an example of the image composition processing that is selected in accordance with the field brightness.

In the example shown in FIG. 6, a brightness $BV_0$ described in No. B is the basic brightness. In No. B, an appropriate output $V_0$ is obtained from the image sensor 5 when exposed with the ISO being fixed, with the aperture value being fixed, and with an electronic shutter speed TV being set to 1/240 seconds. In this case, the image data of four times of divided-exposure are added and this added value is divided by four, thereby generating an image having appropriate exposure. Note that, the image composition processing of No. B is the same processing as the example shown in No. 4 of FIG. 3.

No. A is an example having a brightness higher than that in the case of No. B. No. A shows a case where one exposure time of 1/240 seconds is further reduced and the electronic shutter speed Tv is changed to 1/360 seconds. Note that, when the brightness is higher than that in No. A, one exposure time may be further reduced. The image composition processing of No. A is the same processing as the example shown in No. 5 of FIG. 3.

In FIG. 6, in the cases from No. C to No. G, the field brightness gradually decreases as compared with the case of No. B. In the cases from No. C to No. G, an image having an appropriate exposure is generated by devising the addition operation, with the number of divided frames being fixed to four and with the electronic shutter speed being fixed to 1/240 seconds.

For example, in No. C, the field brightness is between $BV_0-1$ and $BV_0$, and the output of the image data from the image sensor 5 is between $V_0$ and $V_0/2$. Therefore, in No. C, for the addition processing of the image data, the average-addition is performed, i.e., the image data of four times of divided-exposure are added and this added value is divided by four and furthermore multiplied by a gain, thereby generating an image having an appropriate exposure.

In No. D, the field brightness is $BV_0-1$ which is darker than the basic brightness $BV_0$ by one rank, and the output of the image data from the image sensor 5 is $V_0/2$. Therefore, in No. D, for the addition processing of image data, cumulative partial addition is performed and then averaging calculation is performed, i.e. among the image data of four times of divided-exposure, the first two times of image data and the last two times of image data are added, respectively, and the resulting added values are divided by two, thereby generating an image having an appropriate exposure. Note that, the image composition processing of No. D is the same processing as the example shown in No. 3 of FIG. 3.

In No. E, the field brightness is between $BV_0-1$ and $BV_0-2$ and the output of the image data from the image sensor 5 is between $V_0/2$ and $V_0/4$. Therefore, in No. E, for the addition processing of image data, average-addition is performed, i.e. among the image data of four times of divided-exposure, the first two times of image data and the last two times of image data are added, respectively, and the resulting added values are divided by two and furthermore multiplied by a gain, thereby generating an image having an appropriate exposure.

In No. F, the field brightness is $BV_0-2$ which is darker than the basic brightness $BV_0$ by two ranks, and the output of the image data from the image sensor 5 is $V_0/4$. Therefore, in No. F, for the addition processing of image data, cumulative addition is performed, i.e., if the image data of four times of divided-exposure are cumulatively added, this added value becomes an image having an appropriate exposure. Note that, the image composition processing of No. F is the same processing as the example shown in No. 2 of FIG. 3.

In No. G, the field brightness is between $BV_0-2$ and $BV_0-3$, and the output of the image data from the image sensor 5 is between $V_0/4$ and $V_0/8$. Therefore, in No. G, for the addition processing of image data, cumulative addition is performed, i.e., the image data of four times of divided-exposure are cumulatively added and furthermore multiplied by a gain, thereby generating an image having an appropriate exposure. Note that, the image composition processing of No. G is the same processing as the example shown in No. 1 of FIG. 3.

No. H of FIG. 6 is an example in which when the brightness further decreases, two pixels are mixed inside the image sensor 5 so as to secure the sensitivity although the image quality degrades to some extent. Moreover, the gain is increased to achieve an appropriate exposure.

The above-described image composition processing of No. B to No. G are the control common between the manual digital ND filter shooting mode and the automatic digital ND filter shooting mode. Moreover, the image composition processing of No. A and No. H are the control only for the automatic digital ND filter shooting mode.

Figure 7:
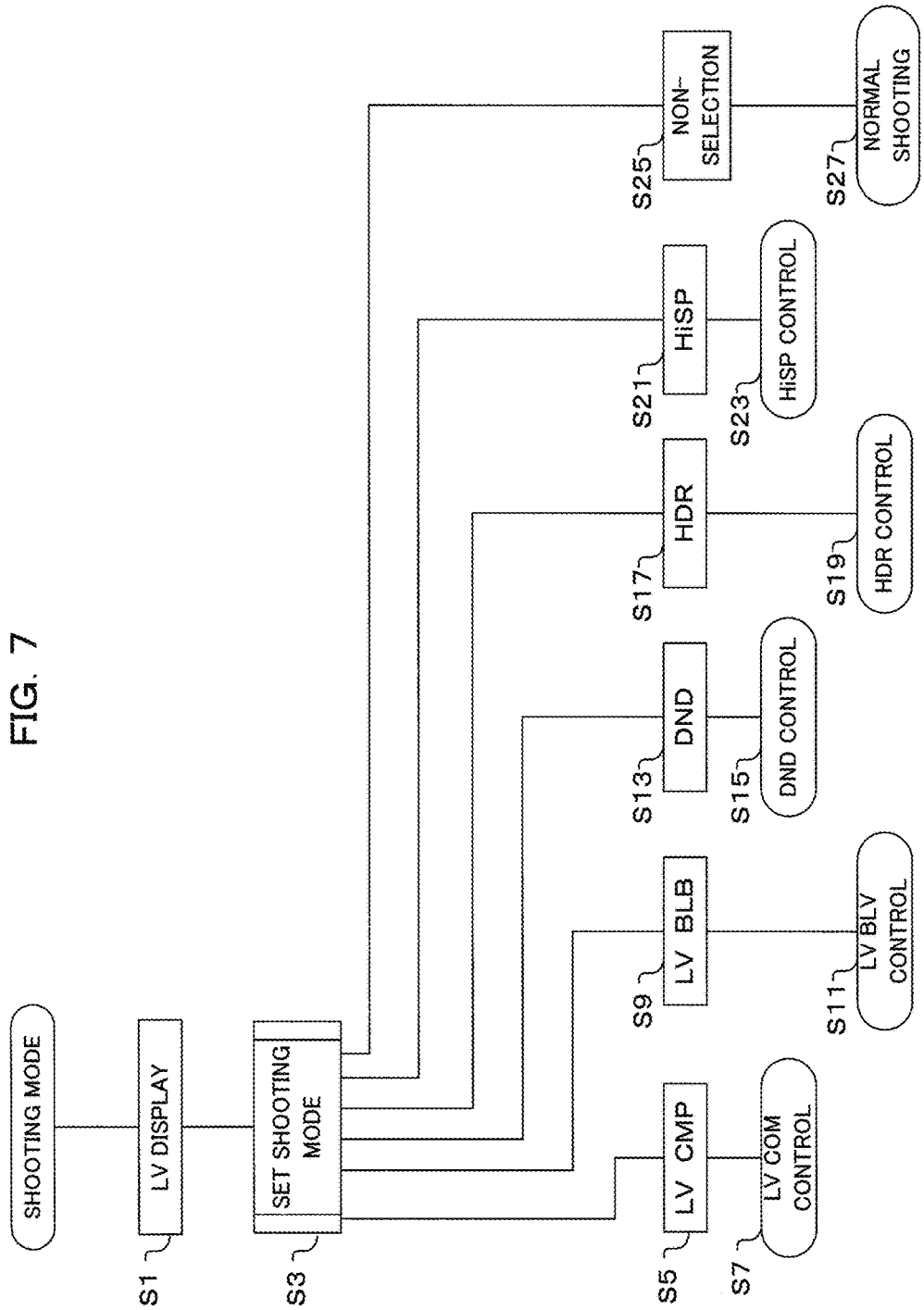
FIG. 7 is a flow chart showing the operation of shooting mode processing in the camera according to the embodiment of the present invention.

Next, the processing of a shooting mode is described using a flowchart shown in FIG. 7. As described using FIG. 4, in the embodiment, five types of shooting modes can be set regarding the imaging control. Note that, this flow chart and the flow charts shown in FIG. 8 and FIG. 9 described later are executed when a CPU in the system control section 27 controls each section in the camera according to programs stored in the internal memory 33.

Entering the flow of a shooting mode shown in FIG. 7, first, live view (LV) display is performed (S1). Here, the normal-processing section 9 processes the image data from the image sensor 5. Then, the gain adjusting section 13, development processing section 15, and image processing section 17, and the like perform live-view display processing on this processed image data, and then based on the resulting image data, the live-view display is performed on the display section 21. A user can determine a composition by observing the live-view display, and also determine the shutter timing of a still image and the timings of starting and finishing to shoot a moving image.

Once the live-view display is performed, then a shooting mode is set (S3). As described above, in the embodiment, the display section 21 displays a menu screen, and then from the menu screen, a shooting mode intended by a user is set with a cross-shaped button or by a touch operation, the shooting mode being related to imaging control. Note that, as the setting method, a shooting mode may be set, for example, with a dedicated button or the like, not limited to by using the menu screen.

If the live composite shooting mode (LV CMP) has been selected in setting a shooting mode in step S3, the live composite shooting mode is set (S5), and live composite control is performed (S7). Upon completion of this control, the process returns to step S1.

If the live bulb shooting mode (LV BLB) has been selected in setting a shooting mode in step S3, the live bulb shooting mode is set (S9), and live bulb control is performed (S11). Upon completion of this control, the process returns to step S1.

If the digital ND filter shooting mode (DND) has been selected in setting a shooting mode in step S3, the digital ND filter shooting mode (DND) is set (S13), and digital ND filter control is performed (S15). Upon completion of this control, the process returns to step S1. The detailed operation of this digital ND filter control will be described later using FIG. 8 and FIG. 9.

If the high dynamic range shooting mode (HDR) has been selected in setting a shooting mode in step S3, the high dynamic range shooting mode is set (S17), and high dynamic range control is performed (S19). Upon completion of this control, the process returns to step S1.

If the high speed shooting mode (HiSP) has been selected in setting a shooting mode in step S3, the high speed shooting mode is set (S21), and high speed control is performed (S23). Upon completion of this control, the process returns to step S1.

If any shooting mode related to the imaging control has not been selected in setting a shooting mode in step S3, the shooting mode is set to non-selection mode (S25) and normal shooting is performed (S27). Here, generally-performed normal shooting is performed. Once the normal shooting is performed, the process returns to step S1.

Next, the detailed operation of the digital ND filter control (DND control) of step S15 in FIG. 7 will be described using the flowcharts shown in FIG. 8 and FIG. 9.

Entering the flow of the DND control, first an ISO sensitivity SV and an aperture value AV are set (S31). Here, a default value or an ISO sensitivity value SV set using a menu screen or the like is set. Moreover, if an aperture priority mode or a manual exposure control mode is already set, the aperture value AV specified by a user is set. If the automatic exposure control mode is already set, a field brightness BV is measured in step S35 described later. Therefore, the aperture value AV is determined from APEX calculation based on the field brightness BV and/or the like. Note that, if SV and AV are already set, the set values are confirmed.

Once SV and TV are set, then the DND mode is selected (S33). As described using FIG. 5, the digital ND filter mode includes two types of modes: the automatic digital ND filter shooting mode (AUTO) and the manual digital ND filter shooting mode (MANU). In this step, which shooting mode has been selected is determined, and the selected shooting mode is set. Moreover, when the manual digital ND filter shooting mode has been selected, the selected dimming amount is also set.

Once the DND mode is selected, then the field brightness BV is measured (S35). Here, the field brightness BV is calculated based on the image data from the image sensor 5.

Once BV is measured, then whether or not the DND mode is the automatic digital ND filter shooting mode (AUTO) is determined (S36). As the result of this determination, if it is the AUTO mode, a composition processing method is determined (S37). Here, based on the BV value detected in step S35, which one of No. A to No. H described above is applicable is judged and determined. As the result of the determination in step S36, if the AUTO mode is "off", a composition processing method is determined based on the set ND value.

Once a composition processing method is determined, then whether or not $V_1 > V_0$ is satisfied is determined (S39). Here, $V_1$ is a value output to the field brightness, assuming that the image sensor 5 is not saturated. $V_1 = kV_0$ is a limited value when the output is saturated. Moreover, $V1 = V0$ corresponds to an appropriate exposure state.

As the result of the determination in step S39, in the case of $V_1 \geq kV_0$, an alarm that the output will saturate is displayed (S41). Note that, as the method for displaying an alarm, either of the following may be used: a warning that an appropriate exposure will not be achieved may be displayed on the display section 21 with a text, an emoji (pictorial symbol), an icon, or the like; a sound producing member, such as a buzzer, may be provided to perform warning by a warning beep; or a vibrating member is provided to perform warning by vibration.

As the result of the determination in step S39, if $V_1 > kV_0$ is not satisfied, then whether or not $V_0/2 < V_1 \leq kV_0$ is satisfied is determined (S43).

As the result of the determination in step S43, if $V_0/2 < V_1 \leq kV_0$ is satisfied, a short shutter speed (T3), including 1/240 seconds, is determined (S44), average-addition is performed (S45), and the gain is adjusted (S47). Here, four pieces of image data obtained by four times of divided-exposure in one frame are sequentially added and the resulting added value is divided by division number four, thereby calculating an average-added value. Once an average-added value is calculated, then gain adjustment is performed. When MANU is already set as the DND mode, the gain is fixed. When AUTO is already set as DND, the gain may be changed, but in this case, an algorithm is preferable, which is carefully designed not to allow the brightness of a screen to abruptly vary. The processing in the steps S43/Yes, S45, and S47 correspond to the above described processing of No. 4 and No. 5 of FIG. 3, and No. A, No. B, and No. C of FIG. 6.

On the other hand, as the result of the determination in step S43, if $V_0/2 < V_1 \leq kV_0$ is not satisfied, whether or not $V_0/4 < V_1 \leq V_0/2$ is satisfied is determined (S49).

As the result of the determination in step S49, if $V_0/4 < V_1 \leq V_0/2$ is satisfied, partial addition is performed (S51), average-addition is performed (S53), and gain adjustment is performed (S55). In this case, as with the case of No. 3 of FIG. 3, two pieces of image data among four pieces of image data obtained during four times of divided-exposure are added (partial addition). Because there are two added values, the both are added and divided by two (average-addition).

Then, gain adjustment is performed. The gain is usually fixed whether the DND mode is AUTO or MANU, as with the case of step S55. The processing in step S49/Yes, S51, S53, and S55 correspond to the above-described processing of No. 3 of FIG. 3 and No. D and No. E of FIG. 6.

On the other hand, as the result of the determination in step S49, if $V_0/4 < V_1 \leq V_0/2$ is not satisfied, whether or not $V_0/8 < V_1 \leq V_0/4$ is satisfied is determined (S57).

As the result of the determination in step S57, if $V_0/8 < V_1 \leq V_0/4$ is satisfied, cumulative addition is performed (S59) and gain adjustment is performed (S61). Here, the n pieces of image data obtained during n times of divided-exposure in one frame are sequentially added to calculate a cumulative addition value. Once the cumulative addition value is calculated, then gain adjustment is performed. The gain is usually fixed whether the DND mode is AUTO or MANU. The processing in step S57/Yes, S59, and S61 correspond to the processing of No. 1 and No. 2 of FIG. 3 and No. F and No. C of FIG. 6.

On the other hand, as the result of the determination in step S57, if $V_0/8 < V_1 \leq V_0/4$ is not satisfied, then $V_1 < V_0/8$ (S71). Here, the output in one exposure implies ⅛ of an appropriate exposure amount $V_0$.

Then, whether or not the DND mode is AUTO is determined (S73). Here, determination is made based on the digital ND filter shooting mode set in step S33.

As the result of the determination in step S73, if the DND mode is AUTO, two-pixel mixing is performed (S75), cumulative addition is performed (S77), and gain adjustment is performed (S79). In this case, although the field brightness is fairly dark, two-pixel mixing is performed in addition to cumulative addition in order to achieve an appropriate exposure by automatic exposure control. In two-pixel mixing, because the image sensor 5 outputs the data obtained by adding two pixels of image data, the pixel value doubles. Cumulative addition is the processing similar to step S59, and gain adjustment is the processing similar to the processing in steps S47, S55 and S61.

Once gain adjustment is performed in step S79, or once a warning is issued in step S81, then the processing of DND control is completed and the process returns to the original flow. As a subject changes, its lightness will also change, and therefore again the same procedure is repeated.

As described above, in one embodiment of the present invention, a plurality of predetermined image composition processing can be performed (the processing of S45 and S47 of FIG. 8, the processing of S51 and S53, the processing of S59 and S61, the processing of S75, S77, and S79 of FIG. 9), and a series of image data substantially-seamlessly output from the imaging section is combined in one processing of a plurality of image composition processing to generate a composite image (e.g., see FIG. 8 and FIG. 9). Therefore, image data having an appropriate exposure amount can be generated without giving a flipping feeling at the time of shooting a moving image. That is, one processing, in which exposure cannot be performed within most of the exposure time determined by the frame rate of a moving image, among a plurality of image composition processing is selected, so that image data having an appropriate exposure amount can be generated without giving a flipping feeling at the time of shooting a moving image. Moreover, because the frame rate is fixed, the processing of changing the frame rate need not be carried out in a short time, the control is facilitated.

Note that, in one embodiment of the present invention, in performing divided-exposure in one frame, the division number is set to four, but the division number is not limited to four. The division number may be changed in accordance with the brightness of a subject, as needed.

Further, in one embodiment of the present invention, as a plurality of image composition processing, the average-addition, partial addition, cumulative addition, gain adjustment, and pixel mixing are combined or one of them is selected. However, as the plurality of image composition processing, it is not necessary to include all of them, or another image composition processing may be combined with the above processing.

Further, in one embodiment of the present invention, as the two-pixel mixing (S75 of FIG. 9), two pixels are mixed in the image sensor 5, but not limited thereto, and two-pixel mixing may be performed in the pre-processing section 7 or may be performed in another section. Moreover, not limited to the two-pixel mixing, the number of pixels to be mixed may be varied in accordance with the brightness, such as three-pixel mixing, four-pixel mixing, or the like.

Further, in each of the embodiments of the present invention, the level determination section 37, exposure determination section 41, and recording format determination section 43 are separated from the system control section 27. However, all of or a part of the level determination section 37, exposure determination section 41, and recording format determination section 43 may be configured by software and executed by a CPU in the system control section 27, its peripheral circuit, and program codes. Moreover, the function of each of the above-described sections may be implemented by a hardware configuration, such as a gate circuit which is generated based on a programming language described in Verilog, or may be implemented by a circuit executed by program codes of a DSP (Digital Signal Processor) or the like, other than being implemented by a hardware circuit or software.

Further, in the embodiment, as the device for shooting, a digital camera has been used and described, but as a camera, a digital single lens reflex camera or a compact digital camera may be used, or a camera for a moving image such as a video camera or a movie camera may be used, and further a camera may be also used which is incorporated into a mobile phone, a smartphone, a mobile information terminal, a personal computer (PC), a tablet type computer, a game console or the like. In either case, the present invention is applicable to any device capable of shooting with divided-exposure.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device that takes an image, the device comprising:

an imaging section configured to repeatedly perform imaging at a cycle shorter than a frame rate of a moving image and output image data, wherein the imaging section includes an image sensor and an optical lens for forming a subject image on the image sensor;

an image processing circuit configured to generate composite image data by (1) performing image combination using a series of the image data, which are output from the imaging section, and (2) multiplying the combined image data by a gain, so as to generate composite image data with appropriate exposure; and a processor for exposure calculation configured to instruct that another image composition processing, that is preliminarily prepared, is switched based on a field brightness, wherein the image processing circuit comprises first image composition processing that is different from image composition processing for generating the composite image by multiplying the combined image data by the gain so as to achieve appropriate exposure, and switches to either (A) the first image composition processing, or (B) the image composition processing for generating the composite image by multiplying the combined image data by the gain so as to achieve the appropriate exposure, in accordance with an instruction of the processor for exposure calculation.

2. The imaging device according to claim 1, wherein the first image composition processing is at least one of cumulative addition, and average-addition.

3. The imaging device of claim 1 wherein the image processing circuit performs image combination, using the series of the image data, based on a selected one of a plurality of different predefined image combination techniques.

4. The imaging device of claim 3 wherein the selected one of the plurality of different predefined image combination techniques was selected based on a determined field brightness of the series of image data.

5. An imaging method for taking an image, the method comprising the steps of:

repeatedly performing imaging at a cycle shorter than a frame rate of a moving image and outputting image data;

generating composite image data by (1) combining a series of the image data and (2) multiplying the combined image data by a gain, so as to generate composite image data with appropriate exposure; and providing an instruction that another image composition processing, that is preliminarily prepared, is switched based on a field brightness, wherein the generating composite image data comprises first image composition processing that is different from image composition processing for generating the composite image by multiplying the combined image data by the gain so as to achieve appropriate exposure, and switches to either (A) the first image composition processing, or (B) the image composition processing for generating the composite image by multiplying the combined image data by the gain so as to achieve the appropriate exposure, in accordance with the instruction.

6. A non-transitory computer-readable medium storing a computer program executed by a computer in an imaging device that takes an image, the computer program causing the computer to execute the steps of:

repeatedly performing imaging at a cycle shorter than a frame rate of a moving image and outputting image data;

generating composite image data by (1) combining a series of the image data and (2) multiplying the combined image data by a gain, so as to generate composite image data with appropriate exposure; and providing an instruction that another image composition processing, that is preliminarily prepared, is switched based on a field brightness, wherein the generating composite image data comprises first image composition processing that is different from image composition processing for generating the composite image by multiplying the combined image data by the gain so as to achieve appropriate exposure, and switches to either (A) the first image composition processing, or (B) the image composition processing for generating the composite image by multiplying the combined image data by the gain so as to achieve the appropriate exposure, in accordance with the instruction.

* * * * *